Feb. 20, 1962    M. H. KOTZEBUE    3,022,054
FRACTIONATING APPARATUS
Filed Nov. 4, 1958    3 Sheets-Sheet 1
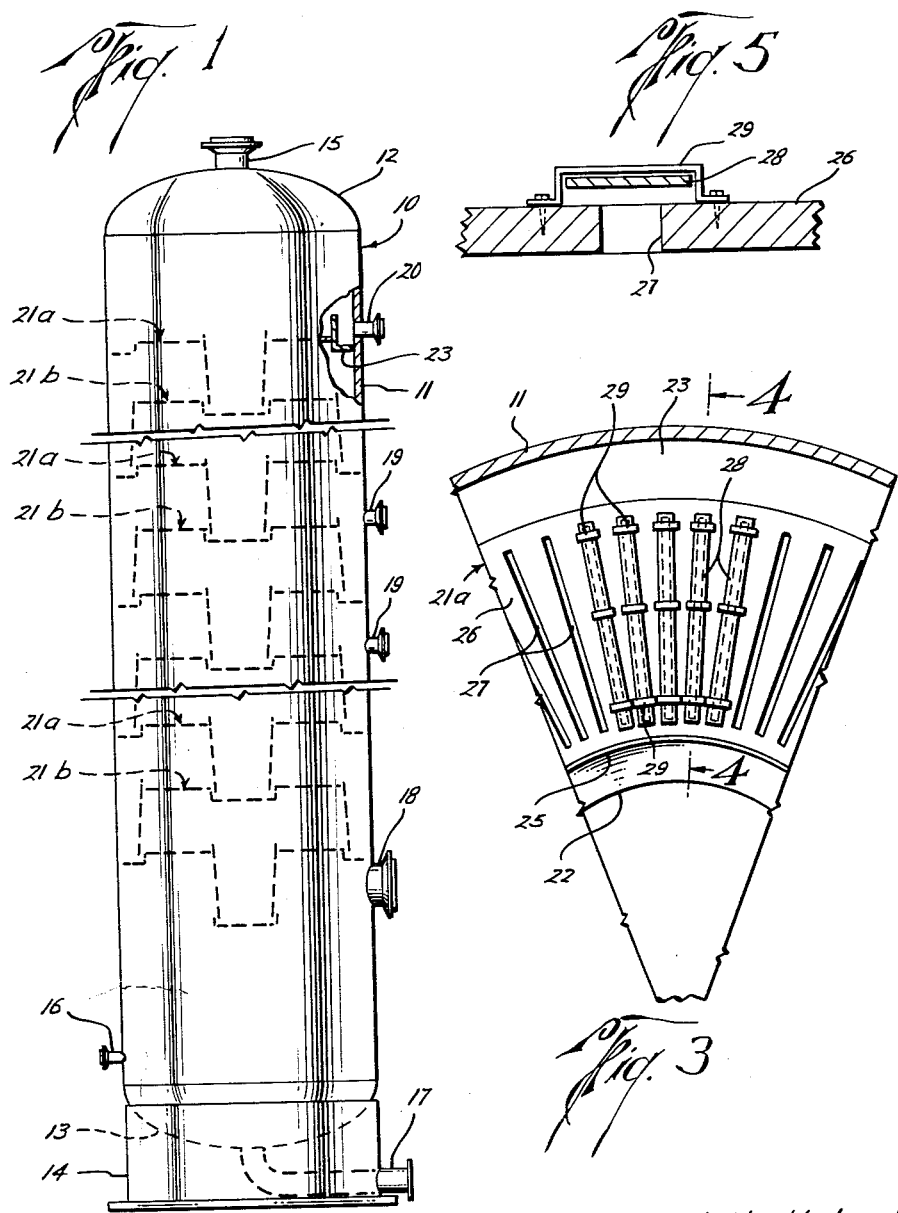
Meinhard H. Kotzebue
INVENTOR.
BY
ATTORNEY

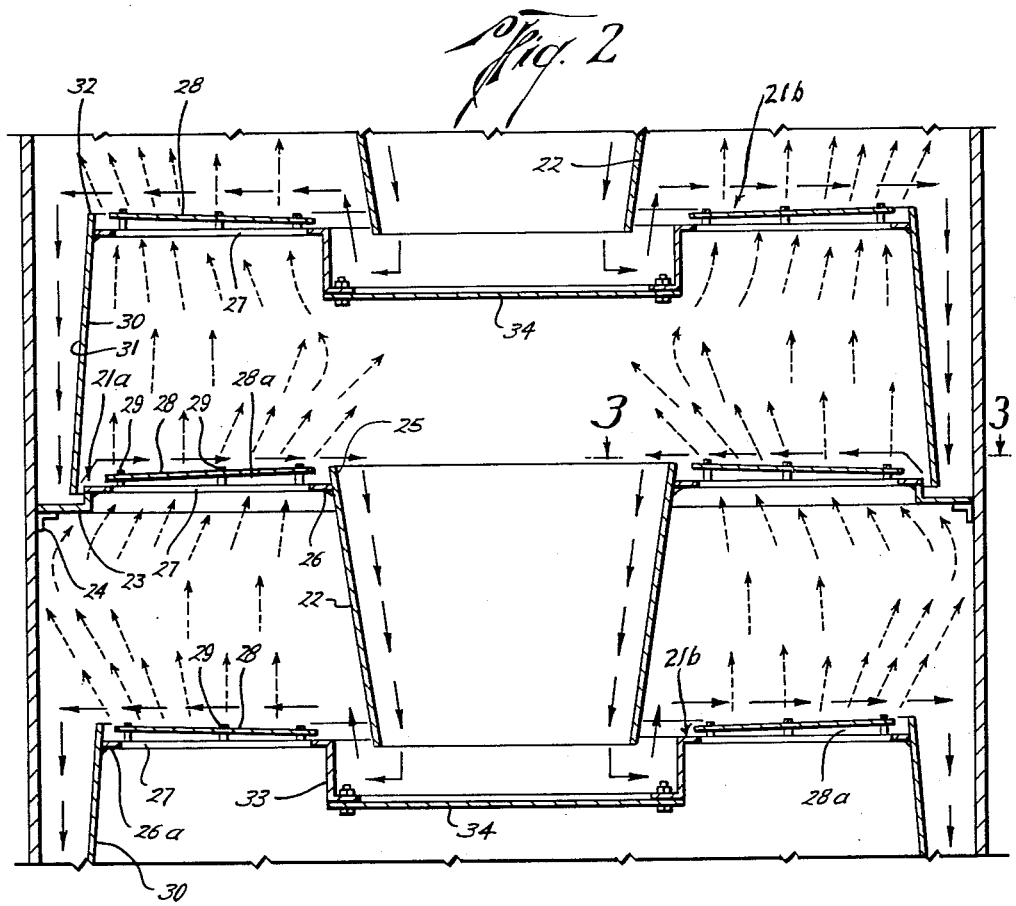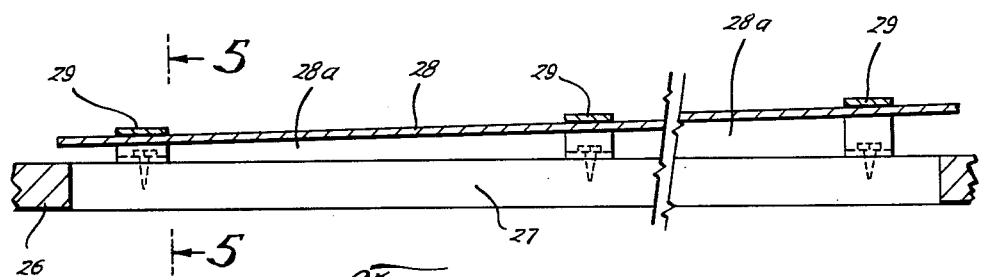

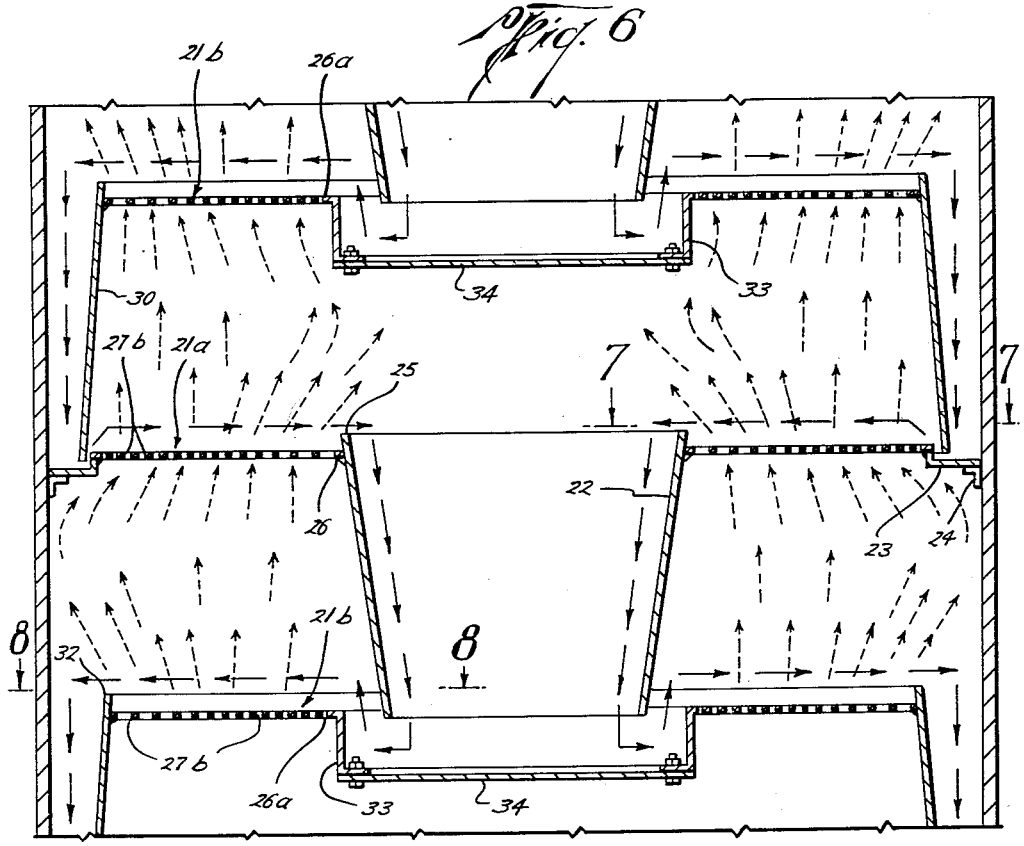
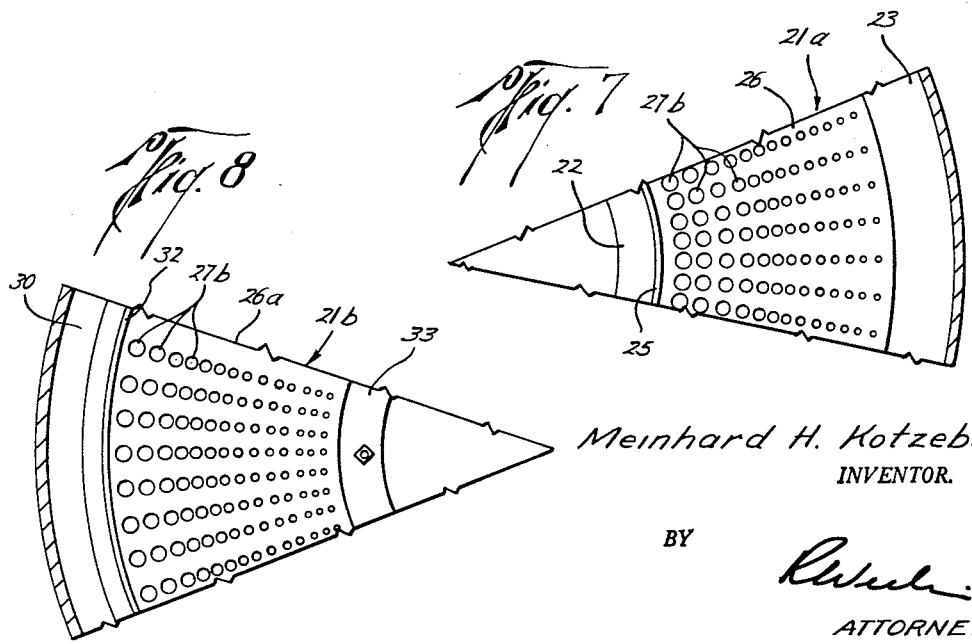

United States Patent Office 3,022,054
Patented Feb. 20, 1962

3,022,054
FRACTIONATING APPARATUS
Meinhard H. Kotzebue, Houston, Tex., assignor to Gasoline Plant Construction Corporation, a Texas corporation
Filed Nov. 4, 1958, Ser. No. 771,895
2 Claims. (Cl. 261—114)

This invention is a continuation-in-part of my co-pending application, Serial No. 630,364, filed December 24, 1956, now abandoned.

This invention relates to fractionating apparatus and particularly to tray constructions and arrangements for fractionating columns of the kind in which liquids and vapors are caused to counterflow to obtain intimate contact therebetween.

Fractionating columns having tray constructions and arrangements in accordance with the present invention, while useful in many industries requiring such apparatus, are particularly useful for fractionation of petroleum hydrocarbons and more especially for the fractionation of large volumes of material comprising close-boiling fractions to effect highly efficient separation of desired constituents having a high degree of purity.

In the separation of close-boiling hydrocarbons as, for example, isobutane from normal butane, isopentane from normal pentane, cyclohexane from a crude fraction thereof, and the like, conventional fractionating devices, such as the well-known bubble-cap trays, are relatively inefficient, requiring large columns employing 100 trays or more to effect separation of a desired product which will usually not exceed 95% in purity, particularly in plant scale operations handling large volumes of material.

The present invention has for its primary objects the provision of an improved fractionating tower or column having novel tray construction and arrangement by which large volume plant scale separations may be effected between very close boiling constituents of a hydrocarbon mixture at fractionating efficiencies approaching 100% with the production of desired products having a degree of purity which is practicably unattainable by present plant scale systems, as for example 99% purity. In particular, the present invention is especially applicable to close fractionation of such large volumes of stocks as require columns six to eight feet in diameter and larger.

A further object is the provision of a fractionating tower having substantially higher efficiency and greater capacity than a more conventional type fractioning tower of the same height and diameter.

An important object is the provision of a tray construction and arrangement by which the hydraulic gradient for the liquid flowing across the trays will be a minimum and maximum utilization of the tower cross-section is made for reduction of entrainment and improved fractionating efficiency.

In accordance with the present invention the foregoing and other objects of this invention may be attained by the employment of a tray arrangement having concentric circular downcomers, the downcomer of one tray being a generally cylindrical tube located in the center of the tray and the next adjacent tray having an annular downcomer disposed about its periphery. This alternating concentric downcomer arrangement causes the liquid to travel across the tray surfaces along radial paths at all points between the downcomers. The liquid will thus be uniformly distributed over the tray surfaces and all portions of the liquid will travel minimum distances between the downcomers to thereby reduce the hydraulic gradient of the trays. The vapor passages are of a suitable shape and are distributed uniformly through the area of the annular sections of the trays defined between the perimeters of the circular downcomers, and are so constructed and arranged that maximum utilization of the entire cross-sectional area of the vapor space between the trays will be attained.

More specifically the vapor passages are so shaped and arranged as to provide increased vapor velocity adjacent the areas occupied by the respective downcomers whereby to direct vapor flow into and through the vapor spaces in the areas overlying the downcomers which, in more conventional constructions, do not enter effectively into the fractionation operation.

A more specific object, therefore, is to provide a tray arrangement having the alternating concentric, central and peripheral downcomers, and gas passages through the trays increasing in orifice area radially toward the peripheries of the respective downcomers. That is, on a tray having the single central downcomer, the gas passage area will be increased from the outer periphery of the tray toward the central downcomer, whereas on a tray having the annular peripheral downcomer the gas passage area will increase radially toward the peripheral downcomer. The result is to produce a vapor velocity gradient in the vapor spaces between the trays, which gradient increases radially in the direction of the respective downcomers.

Other and more specific objects and advantages of this invention will become more readily apparent from the following description when read in conjunction with the accompanying drawing which illustrates useful embodiments in accordance with this invention.

In the drawing:

FIG. 1 is a generally elevational view of a fractionating tower or column in accordance with the present invention, the tray arrangement being illustrated diagrammatically in broken lines;

FIG. 2 is a fragmentary cross-sectional view of the tower illustrating one embodiment of the tray construction and arrangement in greater detail;

FIG. 3 is a partial plan view along line 3—3 of FIG. 2 of one of the trays in accordance with the embodiment of FIG. 2;

FIG. 4 is an enlarged fragmentary longitudinal sectional view along line 4—4 of FIG. 3 showing details of one of the vapor passages and its control elements;

FIG. 5 is a cross-sectional view along line 5—5 of FIG. 4;

FIG. 6 is a view similar to FIG. 2 illustrating another embodiment of this invention including a tray modification employing a different form of the vapor passages through the tray; and FIGS. 7 and 8 are partial plan views along lines 7—7 and 8—8, respectively, of FIG. 6 illustrating the vapor passage arrangements of two of the trays illustrated in FIG. 6.

Referring to FIG. 1, there is shown a fractionating column or tower, designated generally by the numeral 10, comprising the cylindrical shell 11 having the bumped top and bottom heads 12, 13, respectively, and vertically disposed on a supporting skirt 14. Shell 11 is provided with the usual vapor outlet nozzle 15 in top head 12 and liquid draw-off nozzle 16 near the lower portion of the tower. Circulating connections 17 and 18 for a reboiler, heater, stripper, or the like (not shown) are provided in the lower portion of the column in a generally conventional arrangement for such connections. The column is also provided with one or more of the usual feed nozzles 19—19 appropriately spaced along an intermediate portion thereof and near its upper portion with a reflux feed nozzle 20.

Internally the tower is fitted with a plurality of vertically spaced, horizontally disposed trays having two structurally different but cooperable forms which alternate with each other throughout the tower, the two forms of trays being designated generally by the respective numerals 21a and 21b and shown in greater detail in FIGS. 2 to 5.

Tray 21a is generally circular in shape and is provided in the center thereof with a single relatively large diameter circular downcomer 22 and about its outer periphery with an annular depression forming the vapor-seal well 23 on the shell side of the tray. The tray is supportably secured in fluid-tight engagement with shell 11 about its outer periphery in any suitable manner as by means of the angle bracket 24. A circular weir 25 is provided to extend above the upper surface of the tray about the upper end of the downcomer and, as shown, may be formed by projecting the upper end of the downcomer about the tray surface to a height to provide the desired level of liquid on the tray. Downcomer 22 extends below tray 21a a distance such that its lower end will extend beneath the surface of liquid which is maintained on the next lower tray 21b to provide a vapor seal for the downcomer. The wall of downcomer 22 may taper downwardly and inwardly to provide the frusto-conical shape illustrated but it will be understood that downcomer 22 may be cylindrical throughout its length. The portion of tray 21a defined between the perimeters of downcomer 22 and well 23 constitutes the annular floor section 26 which is pierced by a multiplicity of vapor passages 27.

The passages 27 may be of any suitable shape and arrangement to provide maximum uniformity of distribution of the vapor-liquid contacts with minimum pressure drop, and which will provide increasing vapor velocity toward the outer periphery of the tray. In the embodiment illustrated in FIGS. 2 to 5, vapor passages 27 comprise narrow elongate slots which extend radially throughout the area of annular floor section 26 to points closely adjacent the perimeters of downcomer 22 and well 23. The angular spacing between the slots is made substantially equal to provide uniformity in the distribution of the vapor-liquid contacts on the tray.

As best seen in FIGS. 4 and 5, slots 27 are preferably provided with the control strips 28 which function as check-valving elements for the slots and comprise the elongate flat strips, which may be constructed of sheet metal or other suitable rigid material, which register with and overlie the vapor slots 27. Upward movement of control strips 28 is limited by means of a plurality of longitudinally spaced keeper guides 29 of inverted U-shape, the legs of which are secured to the tray surface on opposite sides of the control strips with the base portion extending over and across the valving elements. Guides 29 are arranged to extend to different heights above tray floor 26, the arrangement being such as to allow one end of control strips 28 to raise to a greater height above tray floor 26 than the other end, the strips thereby assuming the inclined position above the vapor slots, as illustrated in the drawings. By means of this inclined arrangement of the control strips, the vapor discharge orifices 28a between the side edges of the strips and the tray floor will increase uniformly radially of the tray, the greater orifice area being at the ends of the control strips adjacent the tray downcomer.

Tray 21b is also of generally circular shape somewhat smaller in diameter than shell 11 to provide an annular downcomer 30 about the tray periphery, downcomer 30 being defined on its outer side by shell 11 and on the inner side by the circular wall 31 secured to the outer periphery of the tray. A circular weir 32 is provided to extend above the upper surface of tray 21b about the upper end of downcomer 30 and, as shown, may be formed by projecting the upper end of wall 31 above the tray surface to a height to provide the desired level of liquid on tray 21b. Wall 31 extends below tray 21b a distance such that its lower end will extend beneath the surface of liquid which is maintained on the next lower tray 21a, preferably in well 23 with which downcomer 30 will be in substantial concentric alignment.

Wall 31 may be tapered downwardly and outwardly to have reduced width at its lower end as shown. At its center tray 21b may be provided with a circular vapor-seal well 33 underlying the lower end of downcomer 22, and well 33 may be provided with a removable bottom 34 whereby to provide access man-ways through trays 21b. The portion of tray 21b defined between the perimeters of downcomer wall 31 and well 33 constitutes the annular floor section 26a which will have substantially the same radial width as floor section 26 of tray 21a. Floor section 26a will also be pierced by vapor passages 27 having the identical form and arrangement as those in tray 21a and being provided with identical control strips 28 and guides 29. Trays 21b may be supported from the tower shell or from trays 21a in any suitable and conventional manner, well understood by those skilled in this art, to maintain the desired spacing between the trays.

The operation of the tower is as follows: Liquid, whether reflux to the top tray or feed to one or more of the intermediate trays, will flow radially inwardly across the tray surface, for example, tray 21a, from the shell side at which it is introduced and will overflow weir 25 and flow through downcomer 22 into well 33 of the next lower tray 21b. From well 33 the liquid will flow radially outwardly across the tray to the shell side of the tray and pass over weir 32 into downcomer 30 which will deliver the liquid into annular well 23 of the next lower tray 21a, whence the liquid will again flow radially inwardly to the central downcomer of the latter tray, this radial in and out flow being repeated as the liquid flows downwardly throughout the entire series of trays. The solid arrows in FIG. 2 designate the path of flow of the liquid across the trays.

The radial movement of liquid between the concentric downcomers provides a maximum degree of uniformity in the distribution of the downflowing liquid over the tray surfaces; reduces the danger of channeling to an absolute minimum; and the radial flow provides the minimum hydraulic gradient for the trays.

The vapor flowing upwardly through the tower from tray to tray, along paths indicated by the broken line arrows in FIG. 2, will pass upwardly through vapor passages 27 and will pass through the bodies of liquid maintained on each tray by the weirs 25 and 32. The depth of liquid maintained on trays 21a and 21b, respectively, will be greater than the maximum height to which control strips 28 are permitted to raise so that the vapor passages will always be covered by liquid. The vapor flowing through the vapor passages will raise the control strips and will bubble through the liquid bodies.

In order, however, to assure maximum fractionating efficiency for the column, it is important that the maximum cross-sectional area of the vapor spaces be utilized. This requires that the otherwise "dead" areas overlying the areas occupied by the respective downcomers should be occupied by upwardly flowing vapor distributed therein in about the same concentration as throughout the remainder of the vapor spaces, in order that these spaces may be employed to reduce entrainment of liquid in the vapors. This desirable result is obtained in accordance with this invention by the employment of vapor passage means which will produce a velocity gradient in the vapors which increases radially in the direction of the respective downcomers, that is, toward the areas of the vapor spaces overlying the downcomers on the respective trays. Thus, as illustrated in FIGS. 2 to 5, in the case of trays 21a having the central downcomers 22, guides 29 will be arranged to allow the ends of control strips 28 adjacent downcomers 22 to raise to a somewhat higher elevation above the tray floor than the opposite ends of these control strips nearest the shell side of trays 21a. On the other hand, in the case of trays 21b, the guides 29 will be arranged to permit greatest elevation of the ends of control strips 28 nearest downcomers 30. The larger orificial areas thus provided adjacent the respective downcomers will allow the vapors to flow at greater velocities through these larger orifices and thereby cause the discharging vapors to spread radially and substantially uniformly throughout the vapor spaces overlying the respective downcomer areas. The broken arrowed lines in FIGS. 1 and 2 illustrate the general path of flow of the vapors through these spaces resulting from the vapor passage control arrangements heretofore described. It will be noted that they indicate the vapor flow as being deflected laterally and, of course, concentrically of the vapor spaces through the areas overlying the downcomers.

The areas of the orifices defined between the side edges of the control strips and the tray floors is preferably made to increase substantially uniform radially of the floor sections of the trays, by employing the uniformly sloping arrangement of the control strips, as illustrated. However, it will be understood that other shapes for the gas discharge orifices may be employed which, while not necessarily increasing uniformly in the radial direction, will, nevertheless, provide the desired increased vapor velocity adjacent the downcomer areas.

It will be understood, of course, that the dimensions of the vapor orifices will vary with the size and capacity of the fractionating tower in which they are to be employed. By way of example, in an eight-foot diameter tower, the control strips may be permitted to rise to a height of 3/8 inch above tray floor sections at their higher ends and to about 1/8 inch at their lower ends.

The uniform angular distribution of the vapor passages, as described, throughout the annular tray sections 26 and 26a, in combination with the uniform radial flow of liquid across the trays, produces maximum uniformity of distribution of the vapor-liquid contacts. This, together with the described arrangement for increasing the vapor velocity adjacent the downcomer areas, provides superior scrubbing, heat exchange efficiency, reduced entrainment, and other advantageous relations between the vapor and liquid as to produce exceptionally high fractionation efficiency, particularly in large diameter columns handling large volumes of hydrocarbons.

The greatly improved efficiency provided by the described tray arrangement and construction enables the separation of constituents of as much as 99% purity from other constituents boiling within only 1° F. of the desired constituent. Moreover, such close efficient fractionation can be attained when fractionating large volumes of material. This invention is especially useful for large capacity towers, that is, towers more than six feet in diameter.

Fractionation efficiencies closely approaching 100% may be obtained with the tray arrangement of this invention as compared with the approximately 50% efficiency of bubble-cap trays or other more conventional liquid-vapor contactors, particularly in high capacity installations.

FIGS. 6, 7 and 8 illustrate another embodiment of this invention by which to obtain the desired increased vapor velocity through the tray areas adjacent the respective downcomers. In this embodiment, the vapor passages are in the form of small perforations 27b arranged in radial rows extending across floor sections 26 and 26a, the rows being spaced apart at uniform angles. The perforations in each row are increased in diameter substantially uniformly in the direction of the downcomers on the respective trays. In the case of trays 21a, the larger diameter perforations will be adjacent central downcomer 22, and in the case of tray 21b, the larger perforations will be nearest the shell side downcomers 30, as illustrated in FIGS. 7 and 8, respectively. In the case of an eight-foot tower, as in the example previously mentioned, the diameters of the perforations will preferably vary uniformly from about 3/8 inch to about 5/8 inch. This embodiment employing the tray perforations is particularly useful in operations having a continuously maintained high vapor velocity, such as will prevent run-back of liquid through the perforations.

The dimensions of the trays and downcomers, and the tray spacing, as well as the design of the vapor passages will be determined in accordance with well-known principles of tower design in relation to the tower sizes, capacities, the feed compositions and the products desired.

It will be understood that numerous changes and modifications may be made in the details of the illustrative embodiments within the scope of the appended claims without departing from the spirit of this invention.

What I claim and desire to secure by Letters Patent is:

1. In a fractionating apparatus including a vertically disposed cylindrical shell, a fractionating tray arrangement for said shell, comprising, a plurality of vertically spaced, horizontally disposed circular trays, alternate ones of said trays having single centrally located circular downcomers, and the intervening trays having continuous annular downcomers about their outer peripheries, the resulting concentric relation of said downcomers cooperating to cause uniformly distributed radial flow of liquid across the tray surfaces between the downcomers, and vapor passage means substantially uniformly distributed through the annular sections of the trays defined between said downcomers, said vapor passage means comprising a plurality of narrow elongate slots extending radially across said annular sections, a narrow elongate closure plate overlying each of said slots and movable vertically relative thereto for opening and closing said slots, and limit means for said plates permitting a greater degree of upward movement of the ends of said plates adjacent the upper ends of said downcomers than of the opposite ends of the plates.

2. A fractionating column, comprising, a vertically disposed cylindrical shell having feed inlets and vapor and liquid outlets, a plurality of vertically spaced horizontally disposed circular trays mounted in the shell, alternate ones of said trays having single centrally located circular downcomers, and the intervening trays having continuous annular downcomers about their outer peripheries, circular weirs about the upper ends of the downcomers, the resulting concentric relation of said weirs and said downcomers cooperating to cause uniformly distributed radial flow of liquid across the tray surfaces between the downcomers, and a multiplicity of vapor passage means distributed substantially uniformly throughout the areas of the annular sections of said trays defined between said downcomers, said vapor passage means comprising narrow elongate slots equi-angularly spaced extending radially across said annular sections, a narrow elongate closure plate overlying each of said slots and movable vertically relative thereto for opening and closing the slots in response to the pressure of vapor flowing upwardly through the slots, and limit means for said plates permitting a greater degree of upward movement of the ends of said plates adjacent the upper ends of said downcomers than of the opposite ends of said plates.

References Cited in the file of this patent

UNITED STATES PATENTS

| | | |
|---|---|---|
| 2,570,215 | Dice | Oct. 9, 1951 |
| 2,672,330 | Swenson | Mar. 16, 1954 |
| 2,718,900 | Nutter | Sept. 27, 1955 |
| 2,747,849 | Colburn et al. | May 29, 1956 |
| 2,772,080 | Huggins et al. | Nov. 27, 1956 |
| 2,809,821 | Constantikes | Oct. 15, 1957 |
| 2,810,562 | Eld et al. | Oct. 22, 1957 |
| 2,973,189 | Chu | Feb. 28, 1961 |

FOREIGN PATENTS

| | | |
|---|---|---|
| 518,215 | Belgium | Mar. 31, 1953 |
| 641,814 | Germany | Feb. 13, 1937 |
| 1,046,409 | France | July 8, 1953 |